(12) United States Patent
Cho et al.

(10) Patent No.: US 7,782,424 B2
(45) Date of Patent: Aug. 24, 2010

(54) COLOR FILTER SUBSTRATE, DISPLAY PANEL HAVING THE SAME, AND METHOD FOR MANUFACTURING THE SAME

(75) Inventors: Woo-Sik Cho, Seoul (KR); Yoon-Jang Kim, Suwon-si (KR); Yun-Seok Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 230 days.

(21) Appl. No.: 11/764,278

(22) Filed: Jun. 18, 2007

(65) Prior Publication Data

US 2007/0291210 A1 Dec. 20, 2007

(30) Foreign Application Priority Data

Jun. 19, 2006 (KR) .................... 10-2006-0054705

(51) Int. Cl.
*G02F 1/1335* (2006.01)
(52) U.S. Cl. ..................................... 349/106
(58) Field of Classification Search .............. None
See application file for complete search history.

(56) References Cited

U.S. PATENT DOCUMENTS

| | | | | |
|---|---|---|---|---|
| 5,781,262 A * | 7/1998 | Suzuki et al. | ............... | 349/128 |
| 6,022,646 A * | 2/2000 | Kim et al. | ............... | 430/7 |
| 6,067,140 A * | 5/2000 | Woo et al. | ............... | 349/129 |
| 6,404,470 B1 * | 6/2002 | Kim et al. | ............... | 349/110 |
| 6,583,846 B1 * | 6/2003 | Yanagawa et al. | ........... | 349/155 |
| 6,717,637 B1 * | 4/2004 | Yoon et al. | ................ | 349/106 |
| 2002/0080309 A1 * | 6/2002 | Bang et al. | ................ | 349/110 |
| 2004/0207780 A1 * | 10/2004 | Matsuoka et al. | ........... | 349/106 |
| 2005/0110924 A1 * | 5/2005 | Kim et al. | ................ | 349/111 |
| 2006/0208984 A1 * | 9/2006 | Kim et al. | ................ | 345/90 |
| 2007/0153160 A1 * | 7/2007 | Lee et al. | ................ | 349/95 |
| 2008/0043163 A1 * | 2/2008 | Park et al. | ................ | 349/42 |

* cited by examiner

*Primary Examiner*—Mike Stahl
(74) *Attorney, Agent, or Firm*—Cantor Colburn LLP

(57) ABSTRACT

A color filter substrate includes a color filter, a common electrode, a first blocking layer, and a second blocking layer. The color filter is formed in a unit pixel. The first blocking layer corresponds to an outline of the color filter. The second blocking layer is formed in the unit pixel, and under the color filter so to be covered by the color filter, thus decreasing a volume of the color filter. A common electrode is formed over the color filter and the first blocking layer. Thus, an amount of a color filter pigment required for manufacturing the substrate may be decreased and manufacturing cost may be decreased.

19 Claims, 8 Drawing Sheets

COLOR FILTER SUBSTRATE, DISPLAY PANEL HAVING THE SAME, AND METHOD FOR MANUFACTURING THE SAME

This application claims priority to Korean Patent Application No. 2006-54705, filed on Jun. 19, 2006 and all the benefits accruing therefrom under 35 U.S.C. §119, the contents of which in its entirety are herein incorporated by reference.

BACKGROUND OF THE INVENTION

1. Field of the Invention

The present invention relates to a color filter substrate, a display panel having the color filter substrate, and a method for manufacturing the color filter substrate. More particularly, the present invention relates to the color filter substrate capable of decreasing manufacturing cost, the display panel having the color filter substrate, and the method for manufacturing the color filter substrate.

2. Description of the Related Art

Generally, a liquid crystal display ("LCD") apparatus includes an LCD panel for displaying an image using transmissivity of liquid crystal, and a backlight assembly disposed under the LCD panel for providing light to the LCD panel.

The LCD panel includes an array substrate, a color filter substrate facing the array substrate, and a liquid crystal layer disposed between the array substrate and the color filter substrate.

The array substrate includes signal lines, thin-film transistors ("TFTs") electrically connected to the signal lines, and pixel electrodes electrically connected to the TFTs. The signal lines include gate lines and data lines intersecting each other. Accordingly, as the gate and data lines intersect each other, the pixel electrodes are formed in predetermined unit pixels.

The color filter substrate includes a blocking layer blocking light, color filters displaying color, and a common electrode formed on the color filters. The color filters are formed to correspond to the unit pixels. Generally, a color filter layer is formed over the substrate and partially etched, to form the color filter. The color filter is formed to have more than a predetermined thickness, for increasing color reproducibility.

As the size of the LCD apparatus increases, the size of the color filter substrate also increases. Therefore, the amount of a color filter pigment required for manufacturing the color filter substrate increases as well. As the amount of the color filter pigment increases, costs for manufacturing the color filter substrate also increase.

BRIEF SUMMARY OF THE INVENTION

The present invention provides a color filter substrate for decreasing the volume of a color filter to decrease manufacturing costs.

The present invention also provides a display panel having the color filter substrate.

The present invention also provides a method for manufacturing the color filter substrate.

In exemplary embodiments of a color filter substrate according to the present invention, the color filter substrate includes a color filter, a first blocking layer, a second blocking layer, and a common electrode. Alternatively, the color filter substrate may further include a protection layer.

The color filter is formed in a unit pixel. The first blocking layer is formed to correspond to an outline of the color filter. The second blocking layer is formed in the unit pixel, and is formed under the color filter so as to be covered by the color filter, so that a volume of the color filter may be decreased. The common electrode is formed over the color filter and the first blocking layer. The protection layer is formed between the common electrode and the color filter, to protect the color filter.

The first and second blocking layers preferably include an organic material and may be formed within a same layer of the color filter substrate. The common electrode may further include a domain dividing portion dividing the unit pixel into a plurality of domains. In this case, the domain dividing portion is preferably an opening portion formed by eliminating a portion of the common electrode.

The color filter substrate may further include a transparent substrate, and the first and second blocking layers are formed on the transparent substrate and within a same layer of the color filter substrate.

In exemplary embodiments of a display panel according to the present invention, the display panel includes an array substrate, a color filter substrate, and a liquid crystal layer. The array substrate includes a pixel electrode formed in a unit pixel, a thin-film transistor ("TFT") electrically connected to the pixel electrode, a signal line electrically connected to the TFT, and a storage line having a storage electrode overlapped with a portion of the pixel electrode. The color filter substrate includes a color filter formed in the unit pixel, a first blocking layer corresponding to an outline of the color filter, a second blocking layer formed in the unit pixel and under the color filter so as to be covered by the color filter, and a common electrode formed over the color filter and the first blocking layer. The liquid crystal layer is disposed between the array substrate and the color filter substrate.

In this case, the second blocking layer may correspond to a portion of the storage line, the portion formed in the unit pixel. The second blocking layer may correspond to a portion of the TFT, the portion formed in the unit pixel. The second blocking layer may correspond to a portion of the signal line, the portion formed in the unit pixel.

The signal line may include a gate line and a data line intersecting each other. The pixel electrode may include first and second pixel portions electrically separated from each other. The TFT may include a first switching part electrically connected to the first pixel portion, and a second switching part electrically connected to the second pixel portion.

The color filter substrate may further include a transparent substrate, and the first and second blocking layers are formed on the transparent substrate and within a same layer of the color filter substrate.

In an exemplary method for manufacturing the color filter substrate according to the present invention, the method includes forming a first blocking layer along an outline of an unit pixel on a transparent substrate and forming a second blocking layer in the unit pixel, forming a color filter in the unit pixel, the color filter covering the second blocking layer, and forming a common electrode over the color filter.

According to exemplary embodiments of the present invention, since the second blocking layer is formed under the color filter in the unit pixel, a volume of the color filter may be decreased, so that costs for manufacturing the color filter substrate may be decreased.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
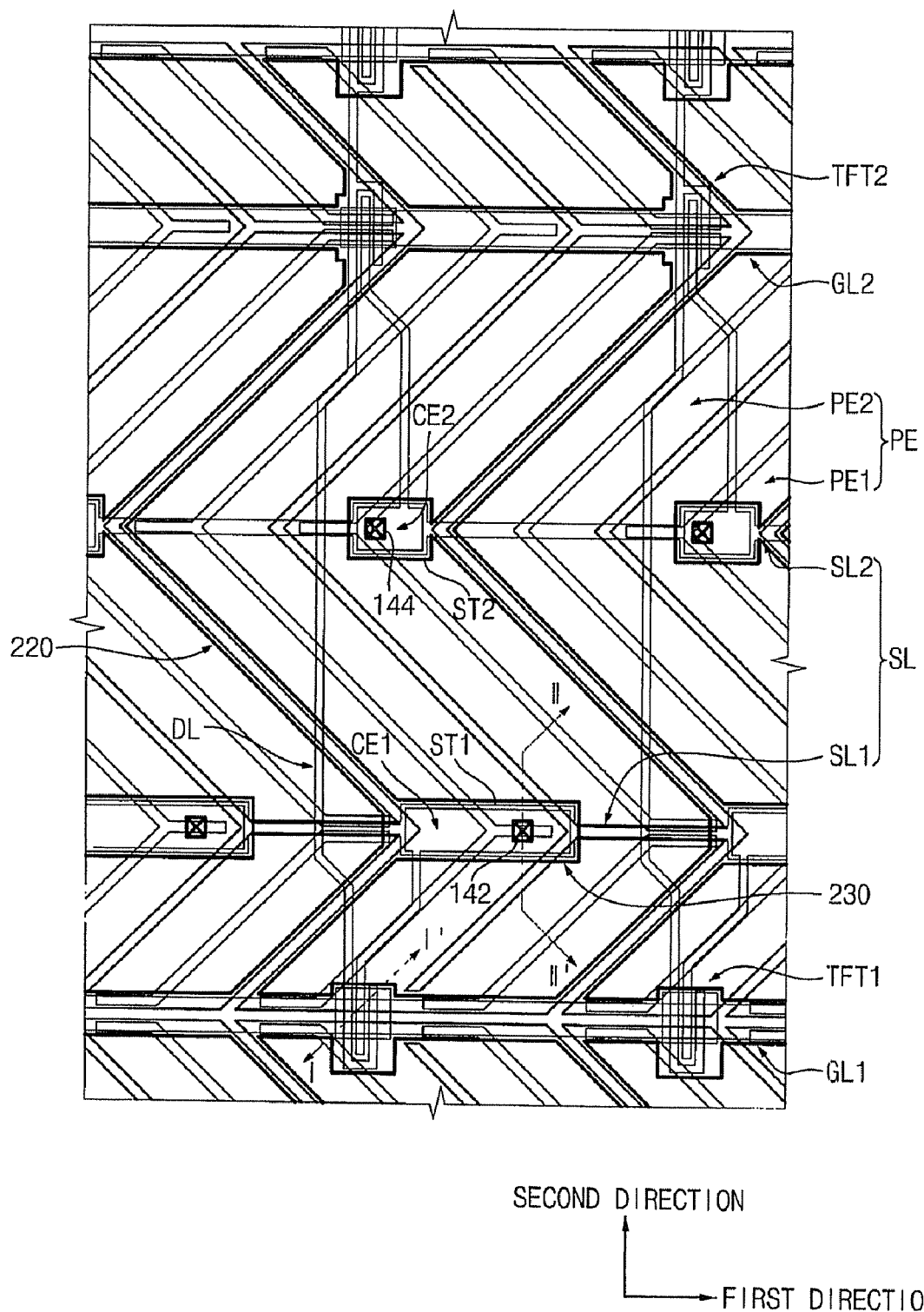
FIG. 1 is a plan view illustrating a unit pixel of an exemplary display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
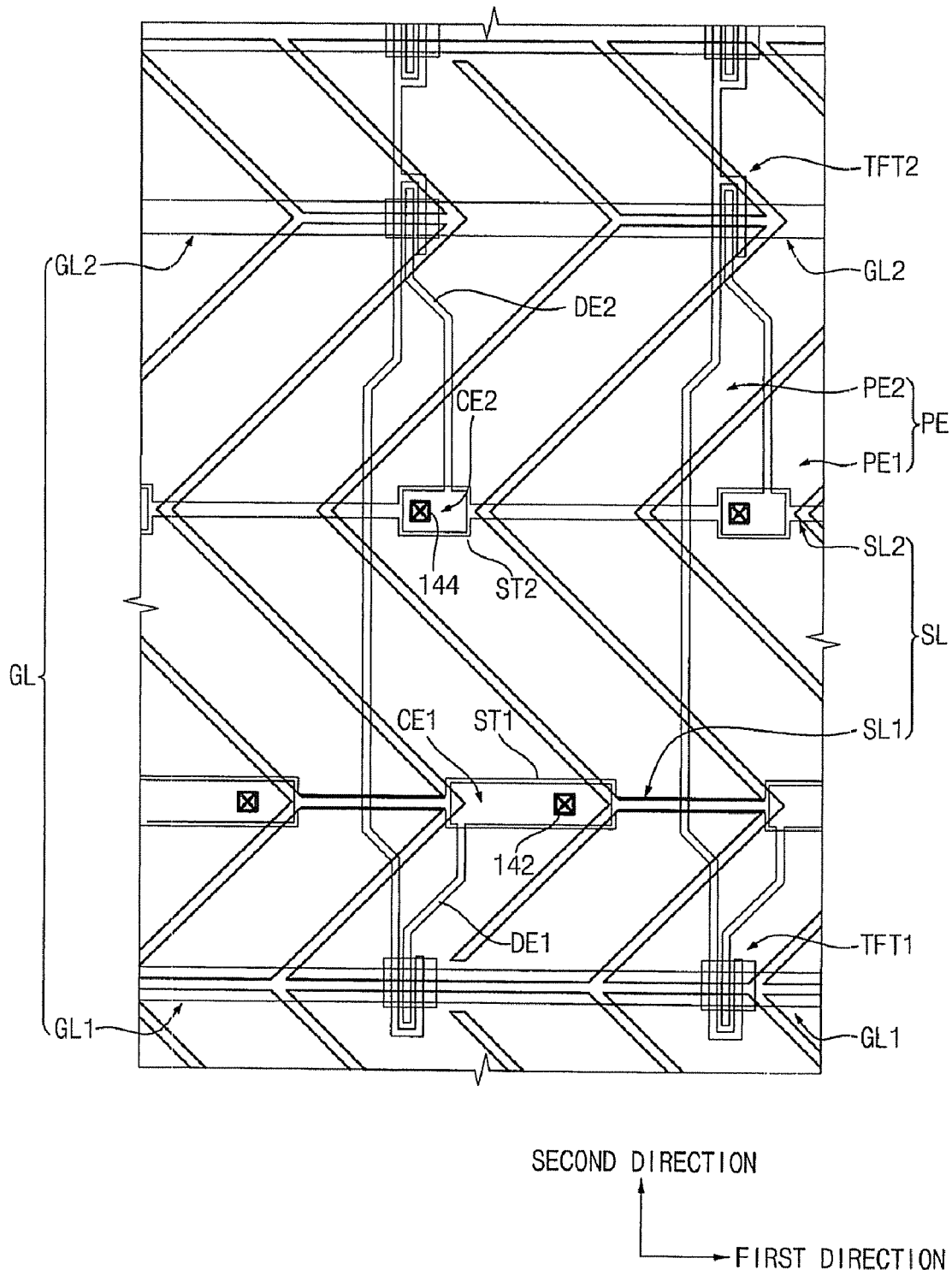
FIG. 2 is a plan view illustrating an exemplary array substrate of the exemplary display panel in FIG. 1.
Figure 3:
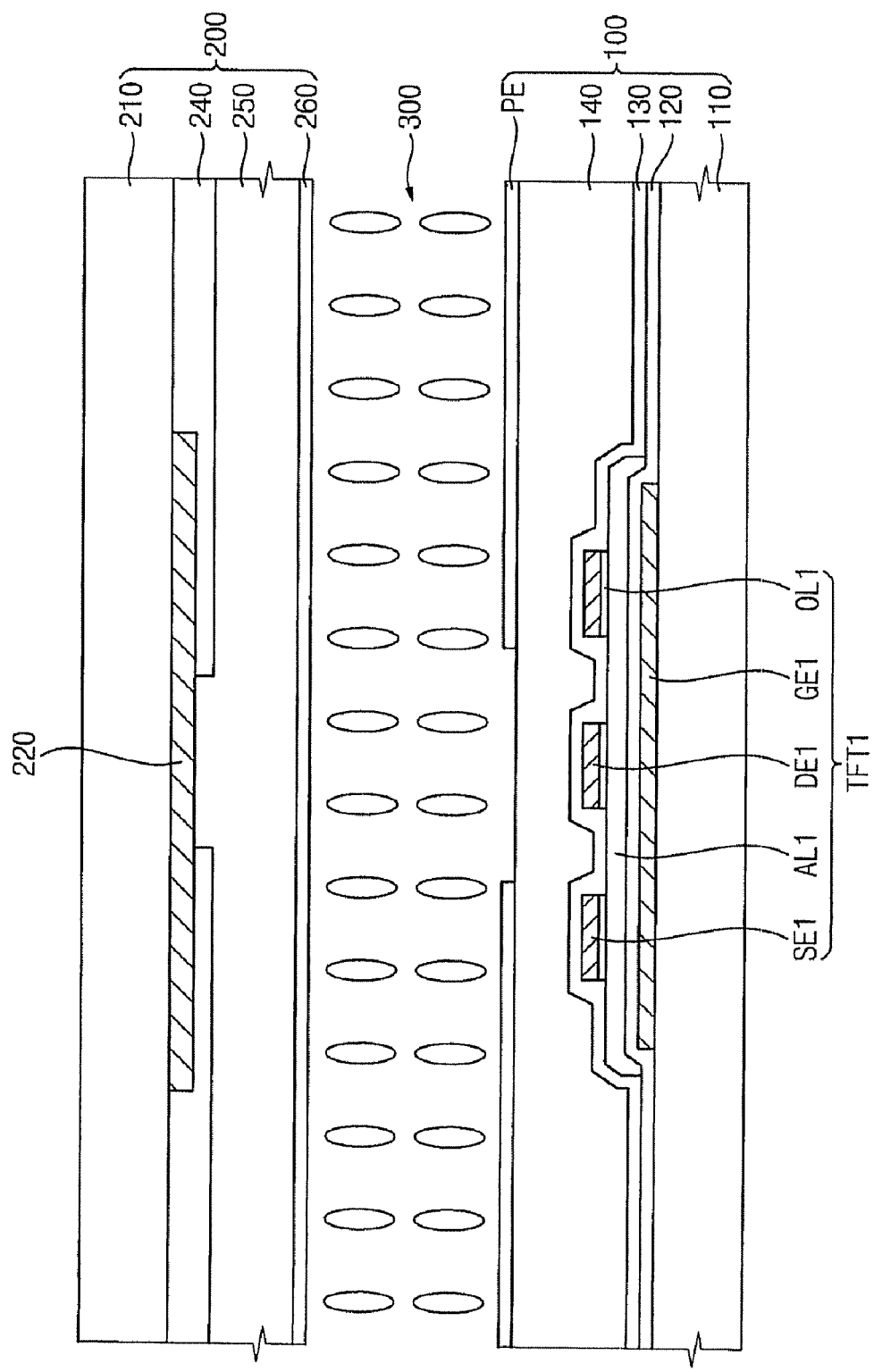
FIG. 3 is a cross-sectional view taken along line I-I' in FIG. 1.
Figure 4:
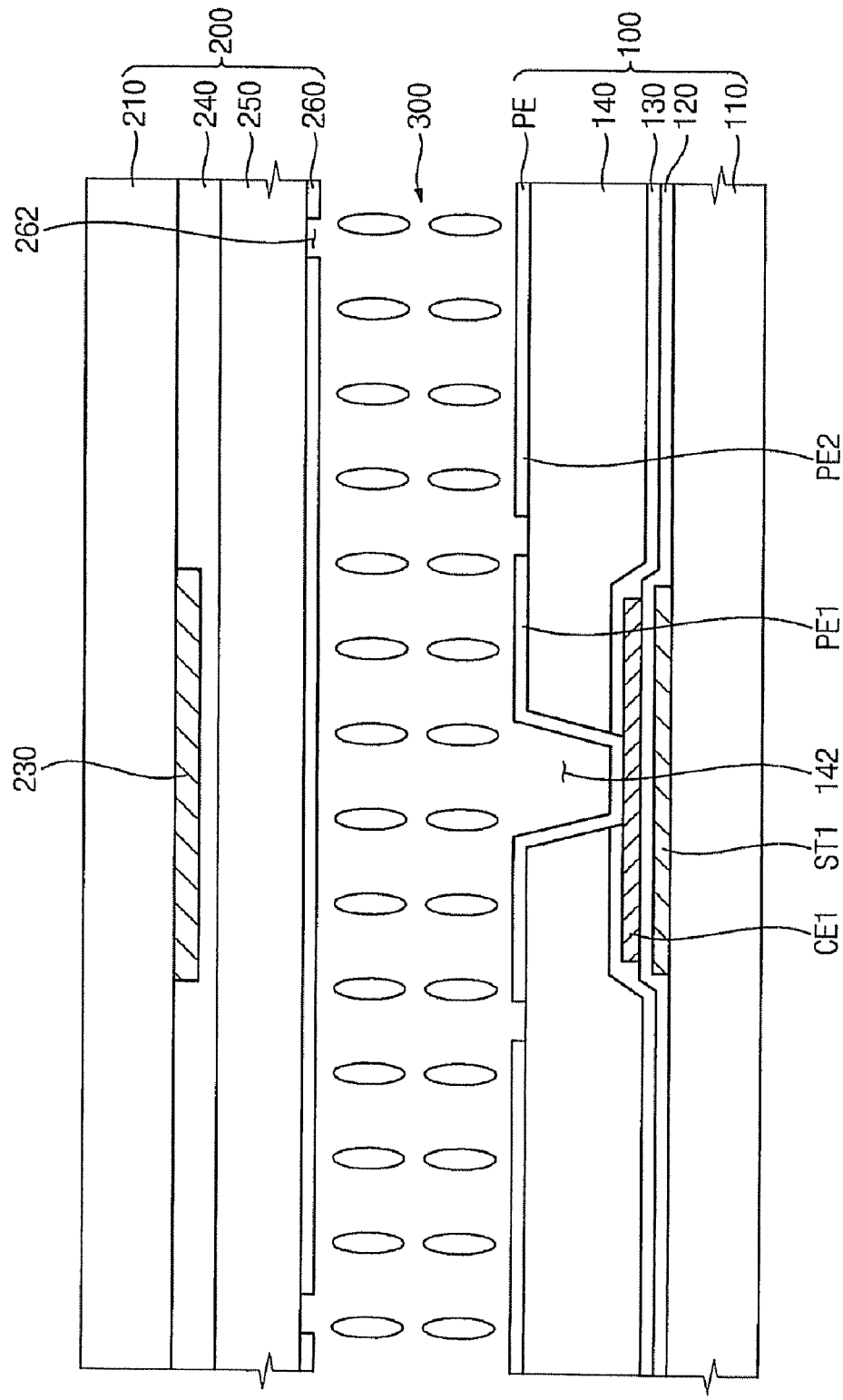
FIG. 4 is a cross-sectional view taken along line I-II' in FIG. 1.

FIG. 1 is a plan view illustrating a unit pixel of an exemplary display panel according to an exemplary embodiment of the present invention, FIG. 2 is a plan view illustrating an exemplary array substrate of the exemplary display panel in FIG. 1, FIG. 3 is a cross-sectional view taken along line I-I' in FIG. 1, and FIG. 4 is a cross-sectional view taken along line II-II' in FIG. 1.

Referring to FIGS. 1 to 4, the display panel according to the present exemplary embodiment includes an array substrate 100, a color filter substrate 200, and a liquid crystal layer 300.

Firstly, referring to FIGS. 1 and 2, the array substrate 100, when viewed on a plane, includes gate lines GL, data lines DL, storage lines SL, pixel electrodes PE, and thin-film transistors ("TFTs").

A plurality of gate lines GL are formed along a first direction, a plurality of data lines DL are formed along a second direction substantially perpendicular to the first direction, and a plurality of storage lines SL are formed along the first direction. The TFTs are electrically connected to the gate and data lines GL and DL. Each pixel electrode PE is formed in a unit pixel, and includes a transparent conductive material. In this case, the unit pixel means a minimum unit for displaying an image. Generally, the unit pixel, when viewed on a plane, preferably has a rectangular shape, but in the present exemplary embodiment, the unit pixel may have a zigzag curved shape.

Detailed descriptions of elements of the array substrate 100 are as follows.

Each pixel electrode PE includes a first pixel portion PE1 and a second pixel portion PE2 electrically separated from each other. A first voltage is applied to the first pixel portion PE1, and a second voltage is applied to the second pixel portion PE2. For example, a level of the second voltage may be larger than that of the first voltage. An area of the first pixel portion PE1 is preferably larger than that of the second pixel portion PE2, and for example, the area of the first pixel portion PE1 may be twice as large as that of the second pixel portion PE2. The first and second pixel portions PE1 and PE2 may have the zigzag curved shape along the second direction, like the shape of the unit pixel.

Each TFT includes a first switching part TFT1 and a second switching part TFT2. The first switching part TFT1 is electrically connected to the first pixel portion PE1, and the second switching part TFT2 is electrically connected to the second pixel portion PE2.

Particularly, a first drain electrode DE1 of the first switching part TFT1 extends along the second direction, to be electrically connected to a first connecting electrode CE1. The first connecting electrode CE1 is formed to be overlapped by a portion of the first pixel portion PE1, and the first connecting electrode CE1 is electrically connected to the first pixel portion PE1 through a first contact hole 142. Preferably, the first connecting electrode CE1 is formed to correspond to a curved position of the first pixel portion PE1.

In the same way, a second drain electrode DE2 of the second switching part TFT2 extends along a direction substantially opposite to the second direction, to be electrically connected to a second connecting electrode CE2. The second connecting electrode CE2 is formed to be overlapped by a portion of the second pixel portion PE2, and is electrically connected to the second pixel portion PE2 through a second contact hole 144. Preferably, the second connecting electrode CE2 is formed to correspond to a curved position of the second pixel portion PE2.

Preferably, the first and second connecting electrodes CE1 and CE2, when viewed on a plane, have a substantially rectangular shape, although other shapes would also be within the scope of these embodiments.

Each of the gate lines GL includes a first gate line portion GL1 and a second gate line portion GL2. The first gate line portion GL1 is electrically connected to the first switching part TFT1, and the second gate line portion GL2 is electrically connected to the second switching part TFT2. Particularly, a first gate electrode is GE1 of the first switching part TFT1 includes a portion of the first gate line portion GL1, and a second gate electrode of the second switching part TFT2 includes a portion of the second gate line portion GL2. In this case, the first gate line portion GL1 may be formed to pass through an edge of the unit pixel, and the second gate line portion GL2 may be formed to cross the unit pixel, so that the first and second gate line portions GL1 and GL2 are overlapped with the portion of the first and second pixel portions PE1 and PE2.

Each of the storage lines SL includes a first storage line portion SL1 and a second storage line portion SL2. The first and second storage line portions SL1 and SL2 are formed along the first direction, for crossing the unit pixel.

The first storage line portion SL1 includes a first storage electrode ST1 partially overlapped by the first pixel portion PE1. The second storage line portion SL2 includes a second storage electrode ST2 partially overlapped by the second pixel portion PE2. Preferably, the first storage electrode ST1 is formed to correspond to the first connecting electrode CE1 and is overlapped by the first connecting electrode CE1, and the second storage electrode ST2 is formed to correspond to the second connecting electrode CE2 and is overlapped by the second connecting electrode CE2.

The first storage electrode ST1 has a substantially rectangular shape, and the area of the first storage electrode ST1 is preferably the same or larger than that of the first connecting electrode CE1. The second storage electrode ST2 has a substantially rectangular shape, and the area of the second storage electrode ST2 is preferably the same or larger than that of the second connecting electrode CE2.

Referring to FIGS. 1 to 4, the array substrate 100, when viewed in a cross-section, includes a first transparent substrate 110, the gate lines GL, the storage lines SL, a gate insulating layer 120, the first and second switching parts TFT1 and TFT2, the data lines DL, a passivation layer 130, an insulating layer 140, and the pixel electrodes PE.

The first transparent substrate 110 has a plate shape, and includes a transparent material. The gate lines GL and the storage lines SL are formed on the first transparent substrate 110. The gate insulating layer 120 is formed on the first transparent substrate 110, and covers the gate lines GL and the storage lines SL. The data lines DL are formed on the gate insulating layer 120.

The first switching part TFT1 includes a first gate electrode GE1, a first active layer AL1, a first source electrode SE1, a first drain electrode DE1, and a first ohmic contact layer OL1.

The first gate electrode GE1 is a portion of the first gate line portion GL1. The first active layer AL1 is formed on the gate insulating layer 120, and overlaps the first gate electrode GE1. The first source electrode SE1 is a portion of each of the data lines DL overlapped with the first active layer AL1, and for example, may include a U shape. The first drain electrode DE1 is separated from the first source electrode SE1 by a predetermined distance, and for example, may be formed at the middle of the first source electrode SE1 having the U shape so as to be partially surrounded by the first source electrode SE1. The first drain electrode DE1 overlaps the first active layer AL1 and extends along the second direction, to be electrically connected to the first connecting electrode CE1. The first ohmic contact layer OL1 is formed between the first active layer AL1 and the first source electrode SE1, and between the first active layer AL1 and the first drain electrode DE1.

The second switching part TFT2 includes a second gate electrode, a second active layer, a second source electrode, a second drain electrode, and a second ohmic contact layer. The second switching part TFT2 is substantially the same as the first switching part TFT1, and thus, any further repetitive description of the second switching part TFT2 will be omitted.

The passivation layer 130 is formed on the gate insulating layer 120, and covers the first switching part TFT1, the second switching part TFT2, and the data lines DL. The organic insulating layer 140 is formed on the passivation layer 130, for flattening a surface of the array substrate 100. In this case, one of the passivation layer 130 and the organic insulating layer 140 may be omitted.

The pixel electrode PE is formed on the organic insulating layer 140. The first connecting electrode CE1 of the first switching part TFT1 is electrically connected to the first pixel portion PE1 through the first contact hole 142, and the second connecting electrode CE2 of the second switching part TFT2 is electrically connected to the second pixel portion PE2 through the second contact hole 144. In this case, a portion of the passivation layer 130 and the organic insulating layer 140 on the first connecting electrode CE1 may be etched, so that the first contact hole 142 may be formed. Also, the portion of the passivation layer 130 and the organic insulating layer 140 on the second connecting electrode CE2 may be etched, so that the second contact hole 144 may be formed.

The pixel electrode PE includes a transparent conductive material. Examples of a material that may be used for the pixel electrode PE may include indium tin oxide ("ITO"), indium zinc oxide ("IZO"), amorphous indium tin oxide ("a-ITO"), and so on.

While a particular embodiment of the array substrate 100 has been described, alternate arrangements of the array substrate 100 may also be within the scope of these embodiments. For example, while each pixel portion has been described as connected to a single data line and a pair of gate lines, each pixel portion may alternatively be connected to a pair of data lines and a single gate line, or to a single data line and a single gate line. Also, for example, a top gate structure may be used in lieu of the illustrated bottom gate structure.

Figure 5:
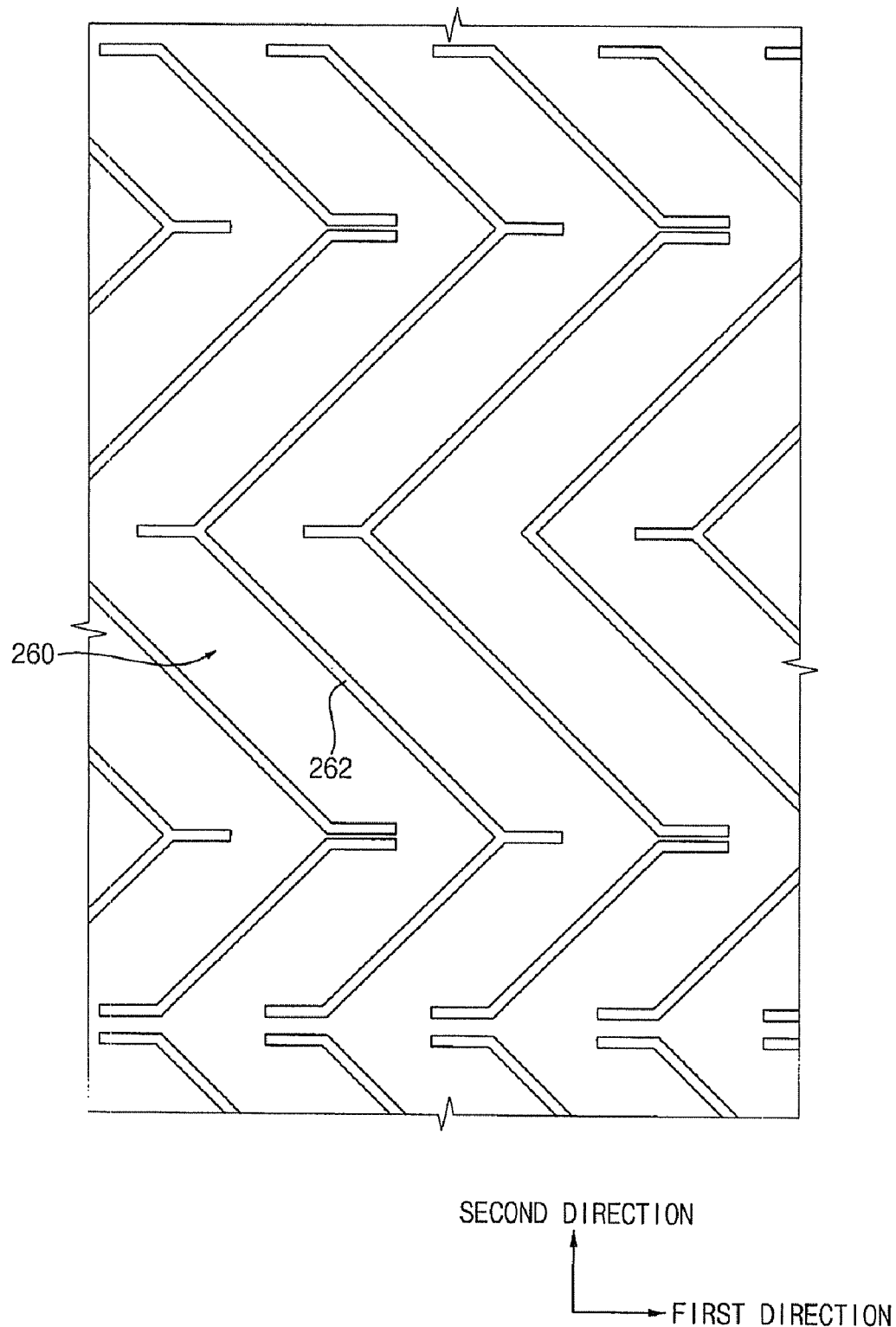
FIG. 5 is a plan view illustrating an exemplary common electrode formed over an exemplary color filter substrate of the exemplary display panel in FIG. 1.
Figure 6:
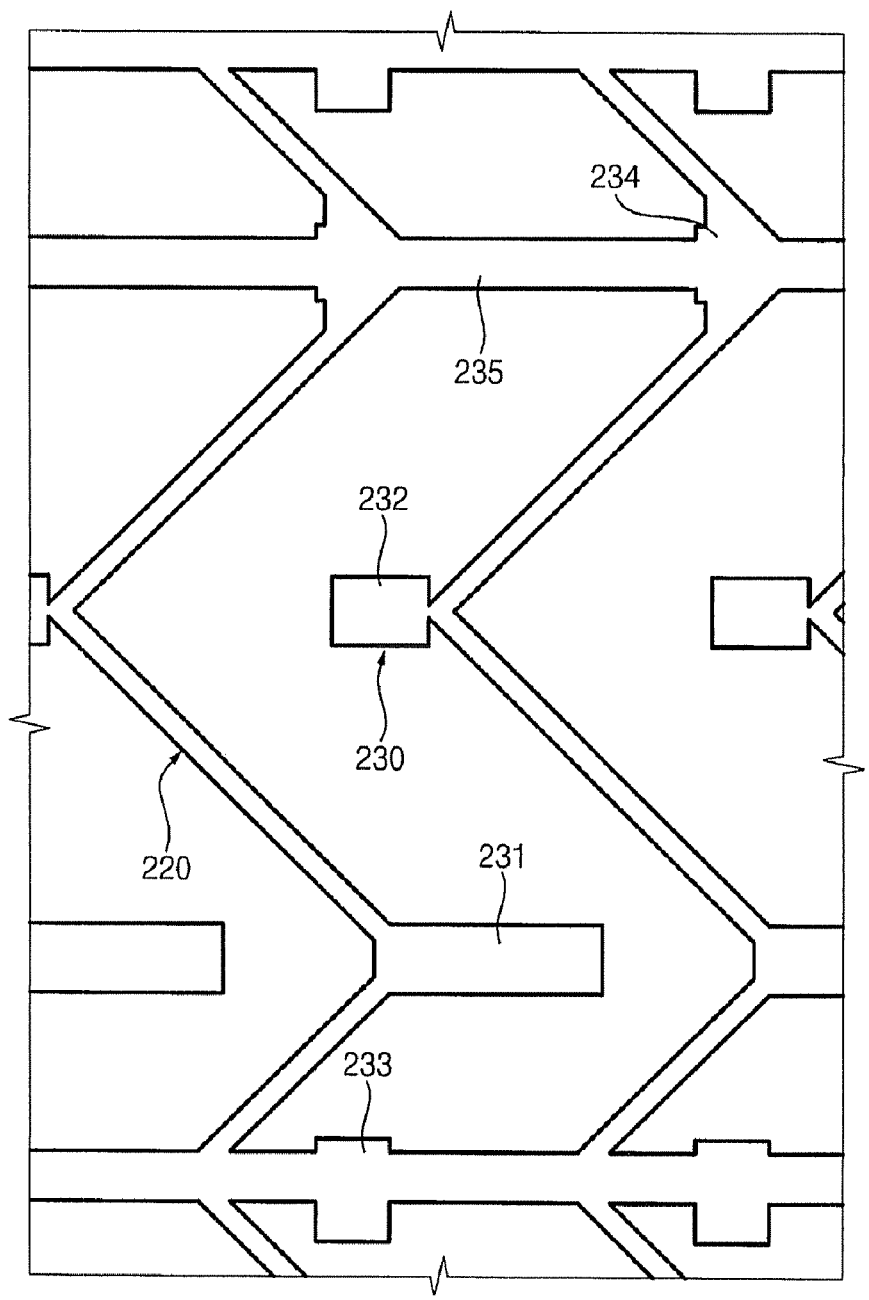
FIG. 6 is a plan view illustrating first and second exemplary blocking layers of the exemplary color filter substrate of the exemplary display panel in FIG. 1.

FIG. 5 is a plan view illustrating an exemplary common electrode formed over an exemplary color filter substrate of the exemplary display panel in FIG. 1, and FIG. 6 is a plan view illustrating first and second exemplary blocking layers of the exemplary color filter substrate of the exemplary display panel in FIG. 1.

Referring to FIGS. 1 and 3 to 5, the color filter substrate 200 according to the present exemplary embodiment includes a second transparent substrate 210, a first blocking layer 220, a second blocking layer 230, a color filter 240, a protection layer 250, and a common electrode 260.

The second transparent substrate 210 has a plate shape, and includes a transparent material, which may be the same transparent material as the material used for the first transparent substrate 110. The second transparent substrate 210 is disposed to face the first transparent substrate 110.

The first blocking layer 220 is formed on the second transparent substrate 210, and is formed in an outline of the unit pixel. The second blocking layer 230 may also be formed on the second transparent substrate 210, but is formed in the unit pixel instead of in the outline of the unit pixel. The first and second blocking layers 220 and 230, for example, preferably include an organic material, but may include an inorganic material such as chromium Cr. In this case, more detailed descriptions about the first and second blocking layer 220 and 230 will follow below.

The color filter 240 is formed in the unit pixel. The color filter 240 is formed on the second transparent substrate 210, and covers the second blocking layer 230. The color filter 240 may also selectively cover a portion of the first blocking layer 220. For example, the color filter 240 may include a red color filter, a green color filter, and a blue color filter.

The color filter 240 is preferably formed to have a predetermined thickness, for increasing color reproducibility. For example, the red color filter may have a thickness between about 1.6 μm and about 1.7 μm, the green color filter may have a thickness of about 1.8 μm, and the blue color filter may have a thickness of about 2.0 μm.

The protection layer 250 is formed on the color filter 240, for protecting the color filter 240 and for flattening a surface of the color filter substrate 200. Preferably, the protection layer 250 includes a transparent organic material.

The common electrode 260 is formed on the protection layer 250. The common electrode 260 may further include a domain dividing portion 262, for dividing the unit pixel into a plurality of domains. The domain dividing portion 262 is preferably an opening portion formed by eliminating a portion of the common electrode 260. However, the domain dividing portion 262 may also or alternatively be a protrusion portion formed from the common electrode 260. The domain dividing portion 262 has the zigzag curved shape along the second direction, like the first and second pixel portions PE1 and PE2. Preferably, the domain dividing portion 262 is formed to correspond to the center of each of the first and second pixel portions PE1 and PE2 along the first direction. While a particular shape of the domain dividing portion 262 is illustrated, alternate shapes are also within the scope of these embodiments.

Referring to FIG. 6 again, the first and second blocking layers 220 and 230 will be further described.

The first blocking layer 220 is formed in the outline of the unit pixel, for blocking movement of light. For example, the first blocking layer 220 may be formed to correspond to the outline of the color filter 240 that is formed in the unit pixel. Thus, the first blocking layer 220 distinguishes between adjacent unit pixels.

On the other hand, the second blocking layer 230 is formed in the unit pixel, and is formed under the color filter 240 so as to be covered by the color filter 240. As the second blocking layer 230 is formed under the color filter 240, the volume of the color filter 240 may be decreased by as much as the volume of the second blocking layer 230.

Particularly, in the illustrate embodiment, the second blocking layer 230 includes a first storage blocking portion 231, a second storage blocking portion 232, a first switching blocking portion 233, a second switching blocking portion 234, and a gate line blocking portion 235.

The first storage blocking portion 231 of the second blocking layer 230 is formed to correspond to the first storage electrode ST1 in the array substrate 100. The first storage blocking portion 231 preferably has a larger area than that of the first storage electrode ST1, for overlapping the first storage electrode ST1 entirely.

The second storage blocking portion 232 of the second blocking layer 230 is formed to correspond to the second storage electrode ST2 of the array substrate 100. The second storage blocking portion 232 preferably has a larger area than that of the second storage electrode ST2, for overlapping the second storage electrode ST2 entirely.

The first switching blocking portion 233 of the second blocking layer 230 is formed to correspond to the first switching part TFT1 of the array substrate 100, and preferably has a larger area than that of the first switching part TFT1, for overlapping the first switching part TFT1 entirely.

The second switching blocking portion 234 of the second blocking layer 230 is formed to correspond to the second switching part TFT2 of the array substrate 100, and preferably has a larger area than that of the second switching part TFT2, for overlapping the second switching part TFT2 entirely.

The gate line blocking portion 235 of the second blocking layer 230 is formed to correspond to the second gate line portion GL2 of the array substrate 100, and preferably has a larger area than that of the second gate line portion GL2, for overlapping the second gate line portion GL2 entirely. The first gate line portion GL1 may be covered by the first blocking layer 220 as the first gate line portion GL1 may define an outline of the unit pixel.

Alternatively, the second blocking layer 230 may further include a data line blocking layer (not shown), for covering the data lines DL. While a particular arrangement for the second blocking layer 230 has been described, it should be understood that the second blocking layer 230 may take on alternate arrangements to correspond to alternate arrangements of the elements that do not transmit light very well within the array substrate 100. In the illustrated embodiment, the second blocking layer 230 is formed within areas that do not transmit light very well, such as the first and second storage electrodes ST1 and ST2, the first and second switching parts TFT1 and TFT2, the second gate line portion GL2, and the data lines DL.

Finally, the liquid crystal layer 300 includes liquid crystal molecules disposed between the array substrate 100 and the color filter substrate 200. The liquid crystal molecules are rearranged by an electric field generated between the pixel electrodes PE and the common electrode 260. The rearranged liquid crystal molecules change light transmissivity, for displaying the image. In this case, the light may be applied from a light source under the display panel, although alternate light source arrangements are within the scope of these embodiments.

According to the present exemplary embodiments, since the second blocking layer 230 is formed within areas that do not transmit light very well and is formed under the color filter 240 in the unit pixel, the volume of the color filter 240 may be decreased. Thus, an amount of a color filter pigment required for manufacturing the color filter substrate 200 may be decreased, and costs for manufacturing the color filter substrate 200 may be decreased.

In addition, since the second blocking layer 230 is formed within areas that do not transmit light well or at all, by blocking the light entirely, the color reproducibility of the display device may be enhanced.

Figure 7A:
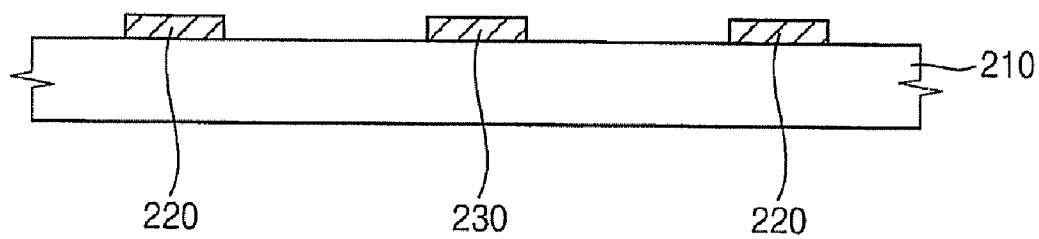
FIGS. 7A to 7D are cross-sectional views illustrating an exemplary method for manufacturing the exemplary color filter substrate according to an exemplary embodiment of the present invention.
Figure 7B:
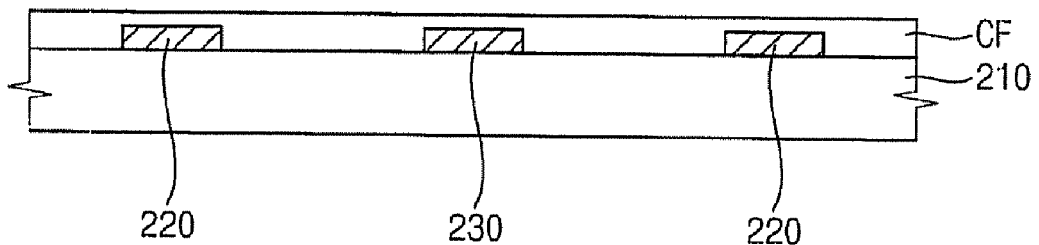
Figure 7C:
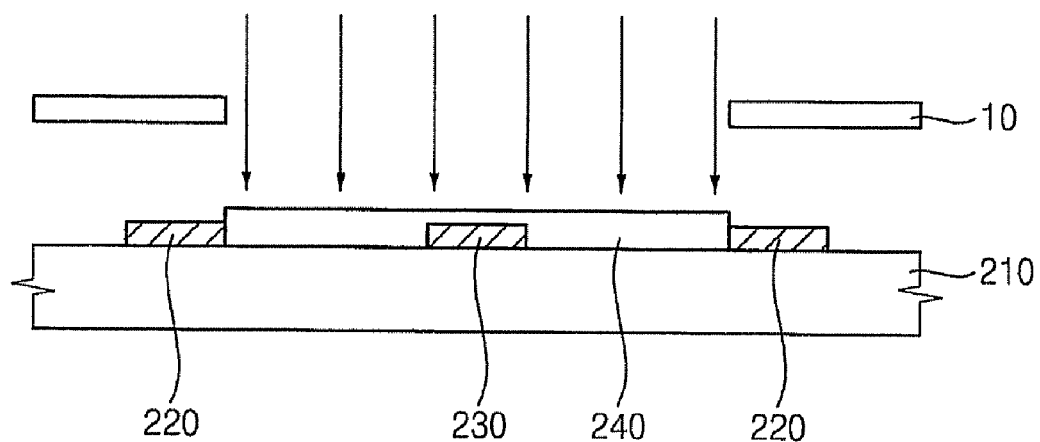
Figure 7D:
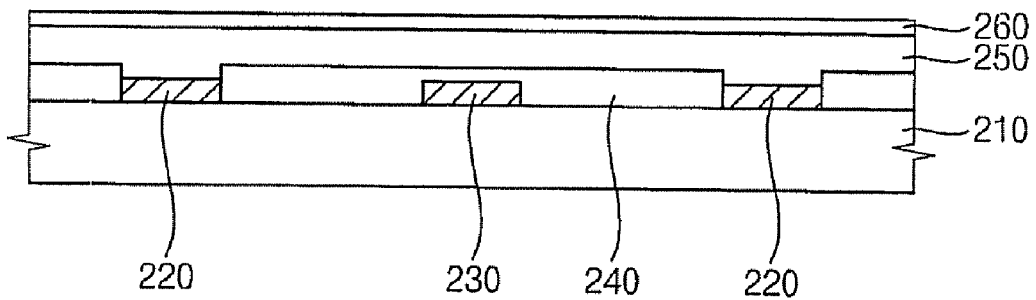

FIGS. 7A to 7D are cross-sectional views illustrating an exemplary method for manufacturing the exemplary color filter substrate according to an exemplary embodiment of the present invention. Particularly, FIG. 7A illustrates forming the first and second blocking layers on the second transparent substrate, FIG. 7B illustrates forming the color filter layer covering the first and second blocking layers, FIG. 7C illustrates patterning the color filter layer, and FIG. 7D illustrates forming the protection layer and the common electrode. Referring to the above figures, the exemplary method for manufacturing the exemplary color filter substrate according to the present exemplary embodiment will be described.

Referring to FIGS. 1, 6, and 7A, the first and second blocking layers 220 and 230 are formed on the second transparent substrate 210. For example, after a blocking layer (not shown) is formed over the entire surface of the second transparent substrate 210, the blocking layer may be patterned to form the first and second blocking layers 220 and 230.

The first blocking layer 220 is formed in the outline, or along the outline, of the unit pixel that is the minimum unit for displaying the image. However, the second blocking layer 230 is formed in the unit pixel, such as within the boundaries of the outline of the unit pixel. While the first and second blocking layers 220 and 230 are illustrated as having a connected pattern, alternatively, portions of the second blocking layer 230 may be disconnected from other portions of the second blocking layer 230 or from the first blocking layer 220. The first and second blocking layers 220 and 230 preferably include an organic material, but alternatively, may include an inorganic material.

Referring to FIGS. 1, 6, and 7B, a color filter layer CF is formed to cover the first and second blocking layers 220 and 230, and may further cover exposed portions of the second transparent substrate 210. Preferably, the color filter layer CF is formed to have a uniform thickness over an entire area. In this case, an amount of the color filter pigment required for forming the color filter layer CF may be decreased by as much as a volume occupied by the first and second blocking layers 220 and 230.

Referring to FIGS. 1, 6, and 7C, the color filter layer CF is patterned using a mask 10, to form the color filter 240. Particularly, a portion of the color filter layer CF is exposed using the mask 10. Then, the exposed portion of the color filter layer CF remains and the unexposed portion is eliminated, so that the color filter 240 is formed. In the present exemplary embodiment, negative characteristics of which the exposed portion of the color filter layer CF is hardened, is described. In an alternative embodiment, the color filter layer CF may have positive characteristics of which the unexposed portion is hardened, such as by using a mask that exposes the portions of the color filter layer CF intended to be eliminated.

The color filter 240 is formed in the unit pixel. For example, the color filter layer CF may be patterned to form the color filter 240 in the unit pixel. Thus, the color filter 240 covers the second blocking layer 230, and may partially cover the first blocking layer 220, such as edges of the first blocking layer 220.

Referring to FIGS. 1, 6, and 7D, the protection layer 250 is formed for covering the color filter 240, and may further cover the exposed portions of the first blocking layer 220. For example, the protection layer 250 preferably includes the organic material, covers the color filter 240 for protecting the color filter 240, and flattens the surface of the color filter substrate 200.

Then, the common electrode 260 is formed on the protection layer 250. After forming the common electrode 260, the common electrode 260 is patterned, so that the domain dividing portion 262 is formed within the common electrode 260.

According to the present exemplary embodiments, since the second blocking layer 230 is formed in the unit pixel, the volume of the color filter layer CF may be decreased, so that an amount of the color filter pigment required for forming the color filter layer CF may be decreased.

Furthermore, according to the present invention, since the second blocking layer 230 is formed in the area that does not transmit light very well and formed under the color filter 240 in the unit pixel, the volume of the color filter 240 may be decreased. Therefore, an amount of the color filter pigment for manufacturing the color filter substrate 200 may be decreased, so that costs for manufacturing the color filter substrate 200 may be decreased.

In addition, since the second blocking layer 230 is formed in the area that does not transmit light for blocking movement of the light, the color reproducibility, such as a contrast ratio, may be enhanced.

Having described the exemplary embodiments of the present invention and their advantages, it is noted that various changes, substitutions and alterations can be made herein without departing from the spirit and scope of the invention as defined by appended claims.

What is claimed is:

1. A color filter substrate comprising:
 a color filter formed in a unit pixel having a zigzag curving shape;
 a first blocking layer corresponding to an outline of the color filter;
 a second blocking layer formed in the unit pixel and formed under the color filter so that the second blocking layer is entirely covered by the color filter, the second blocking layer decreasing a volume of the color filter; and
 a common electrode formed over the color filter and the first blocking layer.

2. The color filter substrate of claim 1, wherein the first and second blocking layers include an organic material.

3. The color filter substrate of claim 2, further comprising a protection layer formed between the common electrode and the color filter, the protection layer protecting the color filter.

4. The color filter substrate of claim 3, wherein the common electrode further includes a domain dividing portion dividing the unit pixel into a plurality of domains.

5. The color filter substrate of claim 4, wherein the domain dividing portion is an opening portion formed by eliminating a portion of the common electrode.

6. The color filter substrate of claim 5, further comprising a transparent substrate, wherein the first and second blocking layers are formed on the transparent substrate and within a same layer of the color filter substrate.

7. A display panel comprising:
an array substrate including a pixel electrode formed in a unit pixel, a thin-film transistor electrically connected to the pixel electrode, a signal line electrically connected to the thin film transistor, the signal line including a first gate line portion formed corresponding to an outline of the unit pixel and a second gate line portion formed in the unit pixel, and a storage line having a storage electrode overlapped with a portion of the pixel electrode;
a color filter substrate including a color filter formed in the unit pixel, a first blocking layer corresponding to an outline of the color filter, a second blocking layer formed in the unit pixel and formed under the color filter so that the second blocking layer is entirely covered by the color filter, and a common electrode formed over the color filter and the first blocking layer, the second blocking layer including a gate line blocking portion corresponding to the second gate line portion; and
a liquid crystal layer disposed between the array substrate and the color filter substrate.

8. The display panel of claim 7, wherein the signal line includes a data line intersecting the first and second gate line portions,
the pixel electrode includes first and second pixel portions electrically separated from each other, and
the thin film transistor includes a first switching part electrically connected to the first pixel portion, and a second switching part electrically connected to the second pixel portion.

9. The display panel of claim 8, wherein the second blocking layer further includes:
a first switching blocking portion corresponding to the first switching part; and
a second switching blocking portion corresponding to the second switching part.

10. The display panel of claim 9, wherein the storage electrode includes:
a first storage portion overlapped with a portion of the first pixel portion; and
a second storage portion overlapped with a portion of the second pixel portion.

11. The display panel of claim 10, wherein the second blocking layer further includes:
a first storage blocking portion corresponding to the first storage portion; and
a second storage blocking portion corresponding to the second storage portion.

12. The display panel of claim 11, wherein the first gate line portion is electrically connected to the first switching part, and the second gate line portion is electrically connected to the second switching part.

13. The display panel of claim 12, wherein the first blocking layer covers the first gate line portion.

14. The display panel of claim 8, wherein a first voltage is applied to the first pixel portion, and a second voltage different from the first voltage is applied to the second pixel portion.

15. The display panel of claim 14, wherein the first and second pixel portions have a zigzag curved shape along a longitudinal direction of the data line.

16. The display panel of claim 15, wherein the color filter substrate further includes a transparent substrate, the first and second blocking layers formed on the transparent substrate and within a same layer of the display panel.

17. A method for manufacturing a color filter substrate, the method comprising:
forming a first blocking layer along an outline of a unit pixel having a zigzag curving shape on a transparent substrate, and a second blocking layer in the unit pixel;
forming a color filter in the unit pixel, the color filter entirely covering the second blocking layer and partially overlapping the first blocking layer; and
forming a common electrode over the color filter.

18. The method of claim 17, wherein forming a color filter in the unit pixel includes:
forming a color filter layer on the transparent substrate, the color filter layer covering the first and second blocking layers; and
etching a portion of the color filter layer to form the color filter in the unit pixel.

19. The method of claim 18, wherein etching a portion of the color filter layer exposes at least a portion of the first blocking layer, the method further comprising forming a protection layer on the color filter and exposed portions of the first blocking layer, wherein the common electrode is formed on the protection layer.

* * * * *